United States Patent [19]
Haque

[11] Patent Number: 4,554,508
[45] Date of Patent: Nov. 19, 1985

[54] CARRIER DETECTION CIRCUIT

[75] Inventor: Yusuf A. Haque, San Jose, Calif.

[73] Assignee: American Microsystems, Incorporated, Santa Clara, Calif.

[21] Appl. No.: 559,157

[22] Filed: Dec. 7, 1983

[51] Int. Cl.⁴ .............................................. H04B 17/00
[52] U.S. Cl. .................... 329/101; 324/78 Q; 329/126; 329/166; 329/192; 329/132; 455/229; 455/234
[58] Field of Search ............... 329/101, 126, 128, 166, 329/192, 203, 204, 205 R, 206, 207, 131, 132; 455/229, 234; 324/78 Q

[56]  References Cited
U.S. PATENT DOCUMENTS 3,746,993  7/1973  Ahmed et al. ................... 329/123 X
4,355,406  10/1982  Guidoux ............................... 375/82
4,441,082  4/1984  Haque ................................. 330/129

FOREIGN PATENT DOCUMENTS 56-58306A  5/1981  Japan .
1342383  1/1974  United Kingdom .
2059202A  4/1981  United Kingdom .

OTHER PUBLICATIONS

"An Electrically-Programmable Switched Capacitor Filter" Authors: D. J. Allstot, R. W. Brodersen, P. R. Gray *IEEE Journal of Solid State Circuits*, vol. SC-14, No. 6, Dec. 1979, pp. 1034–1041.

"An MOS Digitally Controlled Analog Attenuator for Voiceband Signal", Authors: G. L. Baldwin, J. L. McCreary *IEEE Journal of Solid State Circuits*, vol. SC-14, No. 1, Feb. 1979, pp. 74–79.

"An Improved Receiver for Baseband Data Communication Using a Digitally Controlled AGC", Authors: G. Larsen, P. W. Besslich *Int. J. Electronics*, 1977, vol. 43, No. 6, pp. 593–598.

*Primary Examiner*—Siegfried H. Grimm
*Attorney, Agent, or Firm*—Steven F. Caserza; Alan H. MacPherson; Thomas S. MacDonald

[57]  ABSTRACT

A carrier detection circuit includes a rectification stage, an integrator, a comparator, and a digital counter. By utilizing a digital counter, long time constants are provided without the use of external components. If desired, a mark detect circuit is used when a mark must be present to signify the presence of carrier. Hysteresis is provided by the comparator to insure that slight fluctuations in the carrier level do not affect the comparison.

12 Claims, 10 Drawing Figures

FIG 2
RECTIFIER WITH GAIN

FIG. 4
COMPARATOR WITH HYSTERESIS

FIG. 3
SWITCHED CAPACITOR INTEGRATOR

RECTIFIER WITH GAIN FIG. 5

FIG. 6a
FIG. 6b
FIG. 6c

SWITCHED CAPACITOR INTEGRATOR

FIG. 7

CARRIER DETECTION CIRCUIT

BACKGROUND OF THE INVENTION

This invention relates to a circuit for detecting the presence of a carrier signal on a transmission line and, more particularly, relates to a carrier detection circuit suitable for fabrication as a single integrated circuit, or a portion of a larger integrated circuit, requiring no off-chip components.

Modern developments in telecommunications have led to distributed processing, the widespread use of remote terminals and a plethora of stand alone data transmission/receiving stations which communicate with other data transmission/receiving stations. In many cases the individual stations are not manned. Even if they are manned, the information which is received is in an electronic format which is not directly intelligible to the human operator. It is necessary, therefore, for the equipment at each individual station to be able to sense when a carrier signal is being received. This permits the equipment to be readied to receive data. During the times when no carrier signal is being received the individual station may be used for other functions or the human operator may carry out tasks at other locations.

Prior art techniques of ascertaining the presence of a carrier signal in a transmission include measurement of the power level of a carrier signal. These approaches have invariably required the assembly of discrete components and have employed complex signal processing techniques. See, e.g., M. Ahmed, et al, "Carrier Detection Circuit", U.S. Pat. No. 3,746,993; and A. P. Clark, et al, "Detection Processes for a 9600 Bit/Second Modem", The Radio & Electronic Engineer, v. 51, p. 544 (1981), which are hereby incorporated by reference. Carrier detection circuits necessarily require sensitivity to very small signals and have very long time constants. Consequently, previous implementations have either required the use of well controlled off-chip components such as discrete capacitors and resistors and an attendant increase in the number of package leads, or have required the use of digital to analog converters with digital processing circuitry, which requires a large integrated circuit chip area. In order to provide a carrier detection circuit useable with portable terminals, with remote stations, or with modems, it is highly desirable to have a circuit which is capable of being manufactured on a single integrated circuit chip with small die area, reduced number of package leads, and no external components required in order to establish the required time constants.

SUMMARY

The carrier detection circuit of the present invention detects a carrier signal on a transmission line without having to resort to digitizing the incoming carrier and then processing the function digitally. The presence of a carrier signal is indicated when a threshold magnitude is exceeded for a specified period of time. A "mark" must also be detected in order for a valid signal to be indicated. One embodiment of this invention is a circuit which incorporates a full wave rectification with gain stage, a sampled integrator stage, a comparator stage with hysteresis, a mark detect subcircuit, and a digital counter chain. The full wave rectification with gain stage makes use of the full signal strength and provides first stage amplification. The comparator stage compares the output signal from the rectification stage with a reference signal to determine whether the threshold signal strength has been exceeded. Hysteresis insures that slight fluctuations about the value of the reference voltage do not affect the comparison. The digital counter accepts a positive output signal from the comparator stage and counts as long as the positive output signal appears continuously, in order to determine whether the threshold time period has been exceeded. In conjunction with a detection of the presence of a mark, the presence of a valid carrier signal is indicated on the output lead of the detection circuit.

One embodiment of this invention uses analog switched capacitor signal processing techniques with digital counters to implement this carrier detection function. The use of switched capacitor techniques in accordance with the teachings of this invention provides precision amplification and time constants. Further, still larger time constants are obtained by coupling the switched capacitor (or analog signal processing) circuitry with digital counters. This makes it possible to eliminate use of large external resistors or capacitors which were necessary components of prior art circuits.

BRIEF DESCRIPTION OF THE DRAWINGS

For a more complete understanding of the carrier detection circuit of the present invention, reference may be had to the accompanying drawings which are incorporated herein by reference and in which.

DETAILED DESCRIPTION

Carrier detection circuits are required in computer terminals, modems and the like for use in detecting the arrival of a carrier signal which potentially carries data. The protocol for determining whether a carrier signal is present on a line will typically involve both amplitude and time thresholds. It will vary by country, or system. For example, in North America a power level of −43 dbm is typically defined as the minimum acceptable power level for a carrier signal. In order to ensure that a valid carrier signal is present and not merely a flurry of noise, the signal must be present for some minimum time, e.g., 100 milliseconds. With some protocols it is required that a "mark" (binary "one" data transmission) be present in the signal for the required minimum time. For example, data transmission over telephone lines requires that the data transmitted control some characteristic of the carrier signal. For example, in Frequency Shift Keying Modems, data (logical ones and logical zeros, also called "mark" and "space", respectively) is used to modulate a carrier for transmission. For proper demodulation or reconvertion of the data on the carrier to logical ones and zeros (received data), the carrier being received must meet certain predefined conditions. The presence of a carrier signifies that valid data will follow. When the carrier signal and a mark is detected for the requisite minimum time, the modem or associated equipment is actuated. In addition, there is sometimes a requirement in the protocol that the signal must drop below a certain level for a certain time in order to indicate that a carrier signal is no longer present. For example, once the carrier is detected, it may be required that the carrier strength drop below $-48$ dbm for about 10 milliseconds before it is considered that the carrier signal is no longer present.

The typical prior art approach to detecting the carrier signal requires large valued discrete resistors and capacitors in addition to operational amplifiers which require large power supplies ($\pm 12$ V). This does not permit integration of the carrier detect circuit on a single integrated circuit chip with no external components. Recently, a carrier detect circuit (The Texas Instruments TMS99352) has been integrated that uses an external resistor and capacitor and makes it necessary to make available additional pins on the integrated circuit package. Another method of detecting the presence of a carrier consists of digitizing the incoming carrier with an analog to digital convertor and applying the resulting data to a carrier detect circuit constructed using digital design techniques. This technique results in a large integrated circuit die size and so is not economically desirable.

In contrast to prior art carrier detection circuits, the present invention uses analog sampled data techniques to build rectifiers, gain stages and integrators. Switched capacitor techniques are also used and allow the use of precision components (capacitors) which provide precise and large time constants. Without switched capacitor techniques large time constants can be achieved on chip using resistors. However, resistance values are not highly controllable in integrated circuits and thus time constants based on resistance values vary by more than 300%, thus precluding their use here. The time constants required here are extremely large (typically from hundreds of miliseconds to several seconds) and even the use of conventional prior art switched capacitor analog circuits to construct a carrier detection circuit requires a large die area. In accordance with this invention, this situation is alleviated by partitioning the design between an analog signal processing section (consisting of a rectifier with gain, integrators and comparator with hysteresis providing precise, small time constants) and a digital timing section providing very long time constants without requiring any external components and thus not requiring additional package leads dedicated for connection to external components, as is required in all prior art carrier detection circuits which do not use digital to analog converters followed by digital signal processing. This digital timing section serves to provide the additional variable and large time constants required by the circuit after completion by the analog signal processing section of some of the critical signal processing requirements. This particular partitioning allows an efficient design where analog switched capacitor techniques are used to perform most of the signal processing and the digital part of the circuit performs logical and timing functions required. The circuit operates by fully rectifying and amplifying a very weak signal to provide a useable signal. The amplification also amplifies offset voltages and therefore measures are taken to minimize offset voltages and their effects on the proper operation of the circuit.

Figure 1:
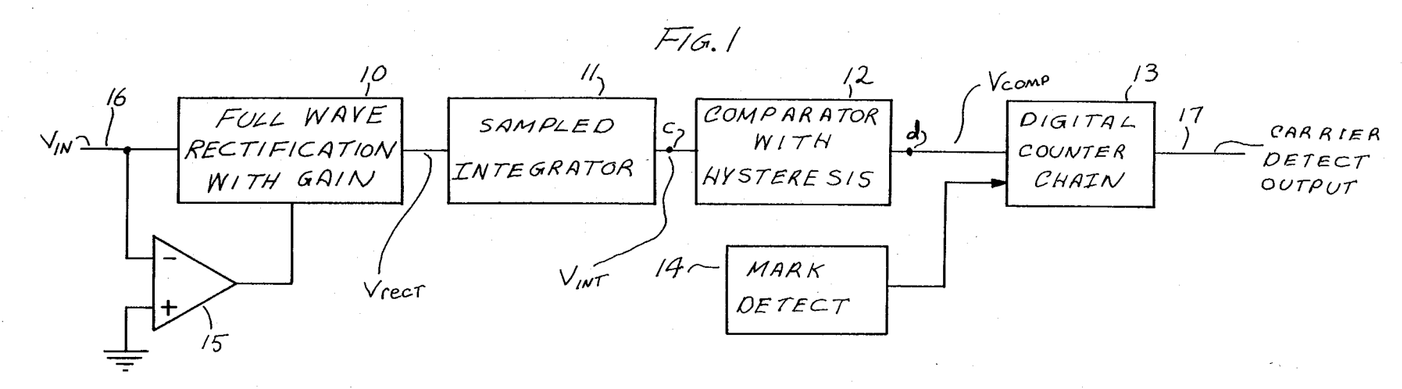
FIG. 1 is a block diagram showing the functional blocks of a carrier detection circuit constructed in accordance with one embodiment of this invention.
Figure 8:
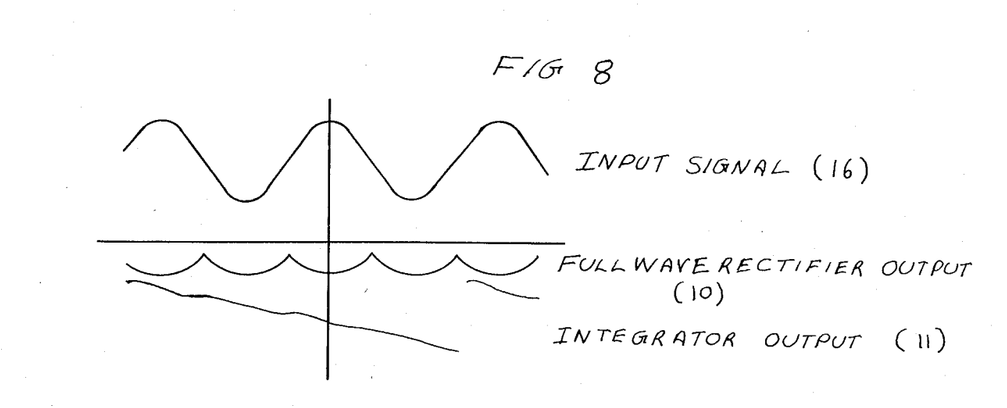
FIG. 8 is a graph of the input signal, full wave rectifier output signal, and integrator output signal for the functional blocks of FIG. 1.

Referring now to the block diagram of one embodiment of this invention shown in FIG. 1, an input carrier signal $V_{in}$ is received on input line 16. The input signal is rectified and amplified by rectification and gain stage 10. The output signal from stage 10 is a measure of the instantaneous amplitude of the incoming carrier signal $V_{in}$. Since the incoming signal $V_{in}$ is alternating, it is necessary to first rectify $V_{in}$ and then integrate the rectified $V_{in}$ signal over a known time period to determine the power level of the input carrier signal $V_{in}$. This is accomplished by sampled integrator 11 which, in one embodiment of this invention, is a switched capacitor integrator. These three signals $V_{in}$, the output of full-wave rectifier 10, and the output signal from sampled integrator 11 are shown in FIG. 8. The output signal from sampled integrator stage 11 is provided as an input signal to comparator 12 for comparison with a reference signal $V_{ref}$ to determine whether the carrier signal $V_{ref}$ exceeds the threshold voltage level established as that voltage level above which a carrier is present. If the input carrier signal $V_{in}$ exceed the threshold voltage as indicated by the output signal from comparator 12, the digital counter 13 is actuated and begins to count in order to determine the total period of time that a carrier signal $V_{in}$ having a magnitude greater than the threshold voltage has been detected. In one embodiment of this invention a mark must also be detected in order for the amplitude and total time thresholds to signify the presence of a valid carrier signal on input lead 16. The presence of a mark is detected by mark detect circuit 14. In this embodiment, if a coincidence occurs between the positive comparison from comparator 12, sufficient time detected by counter chain 13, and the detection of a mark by mark detect circuit 14, then a signal is provided on output lead 17 indicating that a carrier signal has been detected on input lead 16.

The principal circuit blocks of the carrier detection circuit of the present invention can be implemented by conventional circuit techniques. For purposes of illustration of the operation of this invention, embodiments of the full wave rectifier with gain 10 and the sample integrator 11 will now be described.

Figure 5:
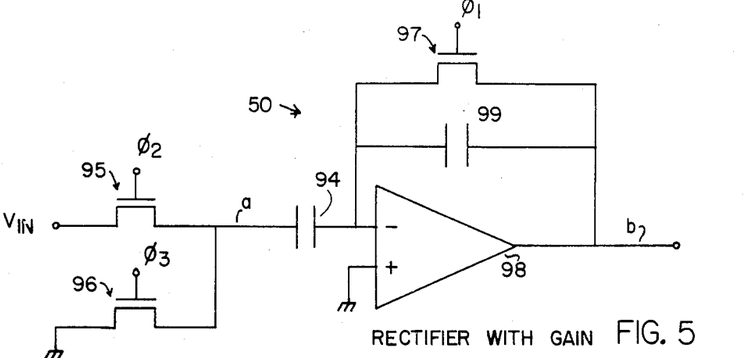
FIG. 5 is a simplified schematic of another embodiment of the rectifier with gain for use with the detection circuit of FIG. 1.

One embodiment of a full wave rectifier with gain 50 suitable for use with this invention is shown in FIG. 5. A switched capacitor approach is used whereby transistors 95, 96 and 97 are operated in accordance with the timing diagrams of FIGS. 6a–6c in order to charge and discharge capacitors 94 and 99. For a general description of the use of switched capacitors see K. Irie, et al., "A Single-Chip ADM LSI Codec", IEEE Tranactions on Acoustics, Speech, and Signal Processing, v. 31, No. 1, February 1983, p. 281, at p. 283, which is hereby incorporated by reference.

Figure 6A:
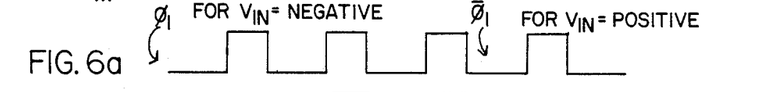
FIGS. 6a, 6b, and 6c form a set of timing diagrams illustrating the method of operation of the switched capacitor integrator of FIG. 7.
Figure 6B:
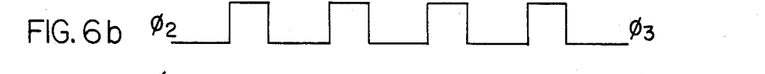
Figure 6C:
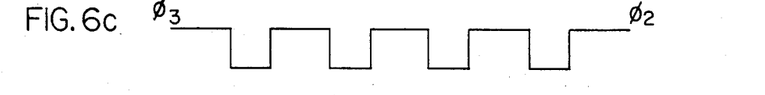

The operation of the rectifier of FIG. 5 can be understood with reference to the timing diagrams of FIGS. 6a–6c. The switching sequence is controlled by the sign of the incoming carrier signal $V_{in}$. A comparator (not shown) provides the rectifier with gain 50 with the sign of the input signal $V_{in}$. For a negative input signal $V_{in}$, clock signals $\phi_1$ and $\phi_2$ both go high. The operational amplifier 98 is thus placed in the unity gain mode, capacitor 99 is discharged, and the inherent offset voltage of operational amplifier 98 is present on both the inverting input lead and the output lead of operational amplifier 98. This causes node a (one plate of capacitor 94) to be connected to $V_{in}$ while the other plate of capacitor 94 is connected to the offset voltage $V_{off}$ of operational amplifier 98, thus charging capacitor 94 to $V_{in} - V_{off}$. Then, $\phi_1$, $\phi_2$ go low and $\phi_3$ goes high, thus opening switches 97, 95 and closing switch 96. Operational amplifier 98 is now configured to act like a gain stage with the gain being set by the ratio of the capacitances of capacitors 94 and 99: $G_{98} = -C_{94}/C_{99}$ when $\phi_3$ is high, node a is connected to ground; hence, a positive voltage transition occurs at node a (from $V_{in}$ to 0, where $V_{in}$ is negative) which is integrated on capacitor 99, thus providing a negative voltage on the output lead of amplifier 98.

Conversely, when the input voltage $V_{in}$ is positive, $\phi_1$ and $\phi_3$ go high and $\phi_2$ goes low, thereby connecting node a to ground, discharging capacitor 99, and charging capacitor 94 to $(0-V_{off})$. Then, $\phi_1$ and $\phi_3$ go low and $\phi_2$ goes high. This connects node a to the positive signal $V_{in}$ and causes a positive transition $(V_{in}-(0-V_{off}))$ of node a. This is integrated on capacitor 99 to provide a negative transition on the output lead of amplifier 98. Thus, a full wave rectification with gain is achieved simply by controlling switching sequence of clock signals $\phi_1$, $\phi_2$ and $\phi_3$ as a function of the sign of the incoming signal. This allows full wave rectification and gain in the same stage and, because the input signal has already been sampled and held, provides a rectified, amplified output signal suitable for further processing by other analog signal processing blocks.

Figure 2:
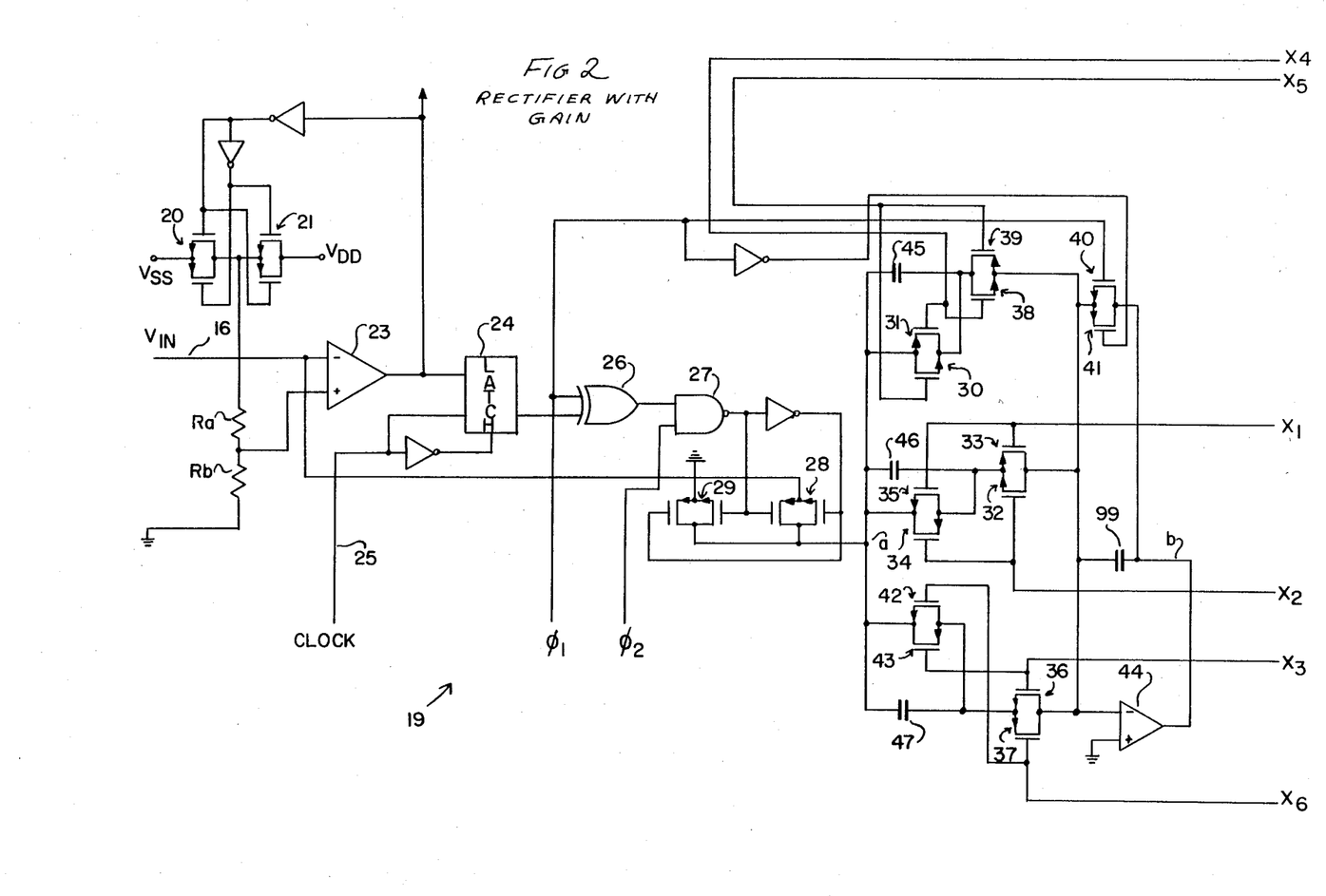
FIG. 2 is a detailed circuit schematic of one embodiment of the rectifier with gain, one of the functional blocks of the carrier detection circuit of FIG. 1.

Another embodiment of a rectifier with gain circuit 19 suitable for use in accordance with this invention is illustrated in FIG. 2. The input signal $V_{in}$ from input lead 16 is provided to the inverting input lead of operational amplifier 23. The noninverting input lead of operational amplifier 23 is connected to a reference voltage obtained by the voltage drop across resistor $R_a$. The source of the voltage applied to resistor $R_a$ is either the negative supply $V_{ss}$ or the positive supply $V_{dd}$ depending upon which of MOS switches 20 or 21 is turned on. The actuation of either of MOS switches 20 or 21 is controlled by latch 24 which is driven by the clock signal supplied on line 25 and holds the information as to polarity of the input signal. The switching of transistors 20, 21 is selected in such a manner as to complement the instantaneous polarity of the incoming signal. For example, when $V_{in}$ is positive, the signal on the output lead of operational amplifier 23 goes low, turning switch 20 on and switch 21 off, thus applying a negative ($V_{ss}$ is negative) input signal on the noninverting input lead of operational amplifier 23. Then, in order to cause the output signal provided on the output lead of operational amplifier 23 to go high, $V_{in}$ must become more negative. In contrast, when $V_{in}$ is negative, the signal on the output lead of operational amplifier 23 goes high, turning switch 20 off and switch 21 on, thus applying a positive ($V_{dd}$ is positive) input signal on the noninverting input lead of operational amplifier 23. Then, in order to cause the output signal provided on the output lead of operational amplifier 23 to go low, $V_{in}$ must become more positive. This provides a hysteresis which is necessary to suppress transitions of the comparators due to the presence of noise.

Rectification of the input signal $V_{in}$ occurs by the use of a switched capacitor gain stage under a controlled switching sequence as described in FIGS. 6a, 6b, 6c. Operational amplifier 44 of FIG. 2 is analagous to operational amplifier 98 of FIG. 5. Switch 97 in FIG. 5 is analagous to switch 40 in FIG. 2. Similarly, switches 28 and 29 in FIG. 2 are analagous to switches 95 and 96, respectively, in FIG. 5. Capacitor 94 (in FIG. 5) consists of any combination of capacitors 45, 46, 47 in FIG. 2. The embodiment of FIG. 2 permits any combination of capacitors 45, 46 or 47 to be used to program the closed loop gain of operational amplifier 44. The selection of capacitor 45 is made by having signal $X_4$ high and signal $X_5$ low; of capacitor 46 by having $X_1$ low and $X_2$ high; and of capacitor 47 by having $X_6$ low and $X_3$ high. Capacitors 45, 46, 47 serve to set the closed loop gain of operational amplifier 44 and thus the gain of stage 19.

Figure 7:
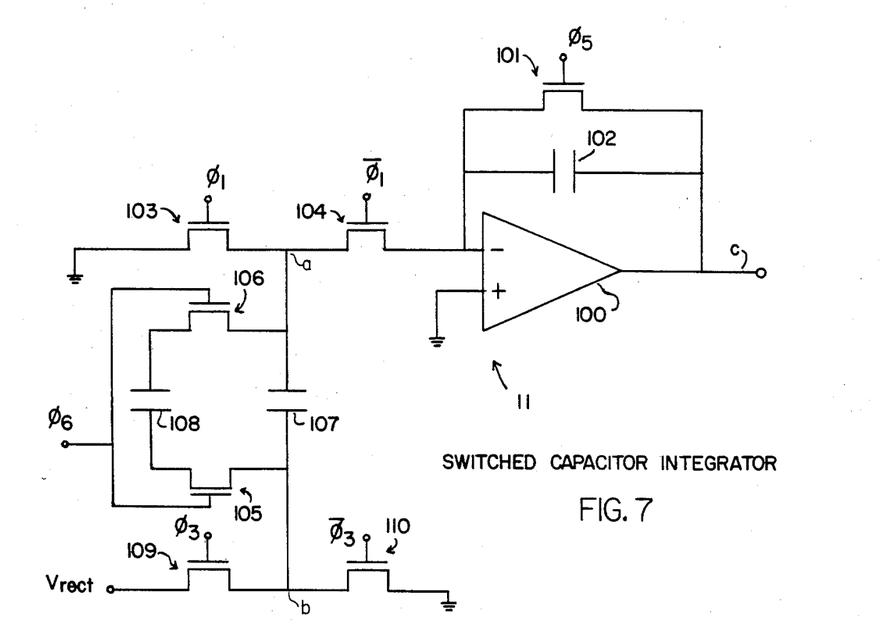
FIG. 7 is a simplified schematic of another embodiment of a switched capacitor integrator for use with the carrier detection circuit of FIG. 1.

One embodiment of the sampled integrator 11 of FIG. 1 is shown in FIG. 7. This embodiment entails the use of a switched capacitor integrator, as described in the K. Irie, et al., reference cited above. The purpose of the sampled integrator is to integrate the output signal from rectifier 10 (FIG. 1). Clock phase $\Phi_5$ periodically goes high in order to turn on transistor 101 and thus discharge capacitor 102. The ratio of the capacitance of capacitor 102 to the capacitance of capacitor 107 determines the closed loop gain of amplifier 100. The input voltage $V_{rect}$ applied to the source of transistor 109 is provided by the output signal from the preceding full wave rectification with gain stage 10 (FIG. 1). Clocks $\Phi_1$ and $\Phi_3$ go high in order to turn on switches 103, 109 and turn off switches 104, 110 and thus charge capacitor $C_{107}$ to $V_{rect}$ (node b) minus ground (node a). Then, clocks $\Phi_1$ and $\Phi_3$ go low to turn off transistors 103, 109 and turn on transistors 104 and 110. This causes node b to be connected to ground and node a is forced to go to virtual ground by being connected to the inverting input lead of operational amplifier 100. As a result of this, the input voltage $V_{rect}$ is integrated on capacitor 102 and appears on output terminal c. The input stage (103, 104, 109, 110) is repeatedly used in this fashion and the output signal on the integrator output lead c continues to update its old output value by adding the incremental output voltage charge provided by the operation of switches 103, 104, 109 and 110. After many cycles of integration, the integrator is reset by clock $\phi_5$ going high, thus closing switch 101 to discharge capacitor 102. Switches 105 and 106, when turned on by a high clock $\phi_6$ connect capacitor 108 in parallel with capacitor 107, thus increasing the effective capacitance connected between nodes a and b. This is useful in changing the gain of the integrator.

Figure 3:
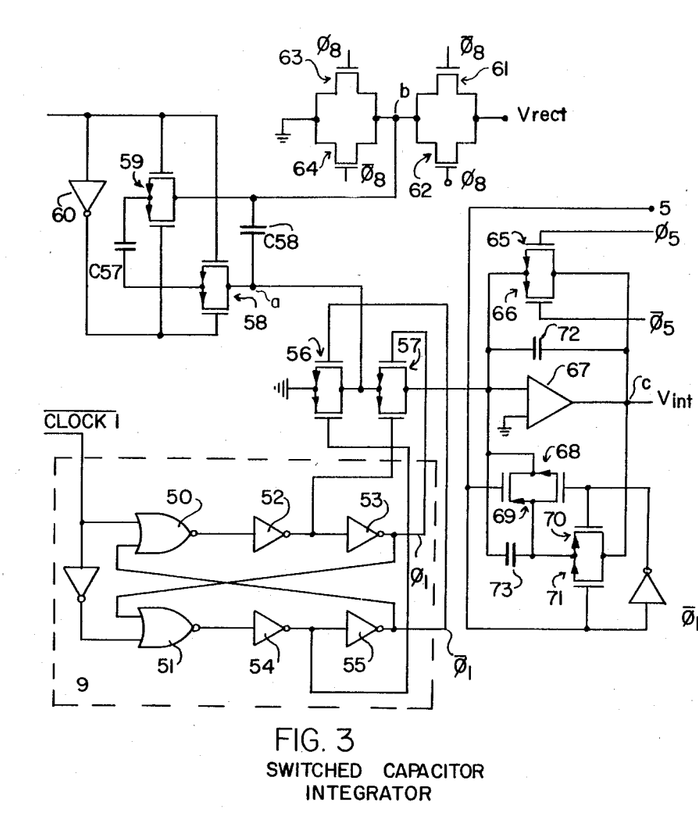
FIG. 3 is a detailed circuit schematic of an embodiment of the switched capacitor integrator utilized in the carrier detection circuit of FIG. 1.

Another embodiment of a sampled integrator 11 suitable for use in this invention is shown in FIG. 3. This embodiment is a switched capacitor integrator which is programmable to permit capacitors, e.g., capacitors 72 and 73, to be selected singularly or in combination as the gain setting capacitors for operational amplifier 67 and thus for integrator 11. Selection of capacitors 72, 73 is made by means of the control line 5.

A subcircuit 9 for generation of a clock signal is shown in the lower left-hand portion of FIG. 3. If desired, such a subcircuit can be provided for each clock used in switched capacitor integrator 11, but is only shown for the purposes of illustration with respect to Clock 1. $\phi_1$ is shown as being generated by means of cross-coupled chains consisting first of NAND gate 50, inverter 52 and inverter gate 53, and secondly of NAND gate 51, inverter 54 and inverter 55. The clock $\phi_1$ and clock $\overline{\phi}_1$ signals are supplied as control signals to MOS switches 56 and 57. For simplicity, the sources of the other clocks for producing clocks $\Phi_5$, etc., are not shown. All clock signals are generated such that the clock signals used to control each pair of switches (e.g., switches 56, 57) are nonoverlapping.

The input voltage $V_{rect}$ to the integrator 11 is supplied to the sources of transistors 61 and 62. When $\phi_1$ and $\Phi_8$ go low, switches 63, 64, 57 turn off and switches 61, 62 and 56 are turned on, thus connecting node b to $V_{rect}$, and connecting node a to ground, thereby charging capacitor C58 to ($V_{rect}-0$) Then $\phi_1$ and $\Phi_8$ go high thus turning on transistors 57, 63, 64.

Thus node b is connected to ground and node a is connected to virtual ground, thus discharging capacitor C58 through capacitor 72, thereby integrating the input signal $V_{rect}$ on integrator capacitor 72. The integrated output voltage $V_{int}$ is available from node c, the output lead of operational amplifier 67.

In another embodiment of this invention, another sequence of steps is used here, wherein $\phi_8$ goes high (transistors 63, 64 turn on) and $\Phi_1$ goes low (transistor 56 turns on), thus connecting nodes a and b to ground, and discharging capacitor C58. Then, $\phi_8$ goes low (transistors 61, 62 turn on) and $\Phi_1$ goes high (transistor 57 turns on), integrating the input signal $V_{rect}$ on integrator capacitor 72. This alternative sequence of steps produces an output voltage having opposite sign to that of the output voltage produced by the earlier sequence.

In one embodiment of this invention cancellation of operational amplifier and switch feed-through offset voltages in the integrator is achieved by operating the integrator for n cycles using the first sequence of steps described above. Then the next n cycles are operated with the input lead grounded ($V_{in}=0$) and using the second sequence of steps described above. Since, in the second n cycles, the sign of the offset voltage is opposite from that of the first n cycles, the offset voltages are canceled over 2 n cycles. In an alternative embodiment, the circuit is operated over n cycles using the first sequence of steps, then (with $V_{in}=0$) capacitors C57, C58 are connected in parallel by turning on switches 58 and 59. This increases the gain of the integrator by a factor of n/m because the ratio of the sum of the capacitance of capacitors C57 and C58 to the capacitance of capacitor C58 alone is m/n. The circuit is then operated for m cycles using the second sequence of steps. The offset voltages again cancel. As is easily understood by those in the art, in this embodiment, capacitor C57 need not be used, in which case n=m.

Figure 4:
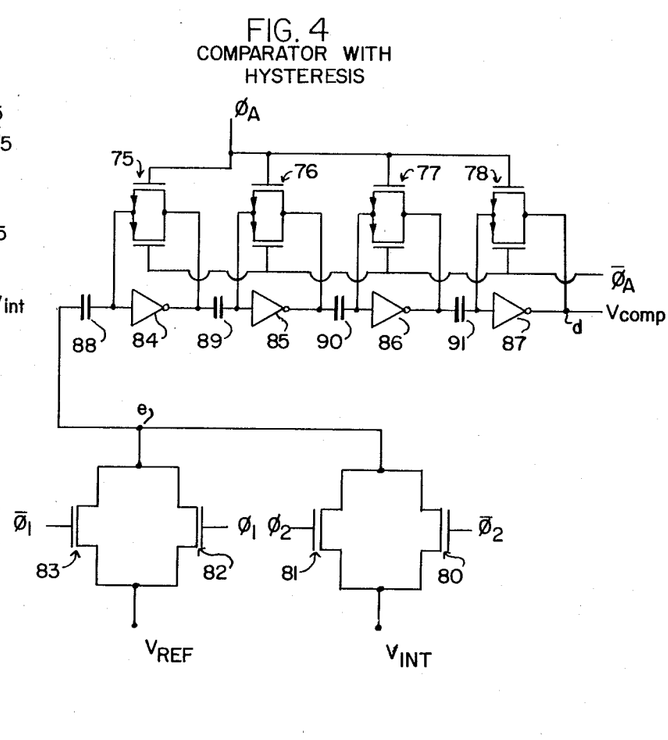
FIG. 4 is a detailed circuit schematic of one embodiment of the comparator with hysteresis utilized with the carrier detection circuit of FIG. 1.

A comparator 12 suitable for use with this invention is shown in FIG. 4. The particular embodiment shown in FIG. 4 includes a hysteresis feature. The input voltage $V_{int}$ is received from output node c of integrator 11 (FIGS. 1, 3) and presented to the sources of transistors 80 and 81 which are controlled, respectively, by clocking signals $\Phi_2$ and $\overline{\Phi}_2$. The reference voltage $V_{ref}$ is supplied to the sources of transistors 82 and 83 whose gates are controlled, respectively, by clocking signals $\Phi_1$ and $\overline{\Phi}_1$. The polarity of difference between $V_{int}$ and $V_{ref}$ indicates whether the input voltage $V_{int}$ exceeds the value of the reference voltage $V_{ref}$. Thus, it is important to amplify this difference and determine this polarity, i.e., to determine when $V_{int}$ crosses over $V_{ref}$. This difference signal with appropriate polarity is provided on output node d after being amplified by the four amplifier stages. Each gain stage includes an MOS switch, a capacitor and an inverting amplifier. The first stage consists of MOS switch 75, capacitor 88 and amplifier 84; the second stage consists of MOS switch 76, capacitor 89 and amplifier 85; the third stage consists of MOS switch 77, capacitor 90 and amplifier 86; and the fourth stage consists of MOS switch 78, capacitor 91 and amplifier 87. The output difference voltage $V_{comp}$ supplied on output terminal d is available for input to the digital counter chain 13 of FIG. 1.

When $\Phi_A$ goes high all inverting amplifiers 84, 85, 86, 87 are reset and self-biased. Also, at this time, transistors 80 and 81 are turned on so that $V_{int}$ is connected to input node e. Then $\Phi_A$ and $\Phi_2$ and $\overline{\Phi}_1$ go low and $\Phi_1$ and $\overline{\Phi}_2$ go high so that the value $V_{int}$ minus $V_{ref}$ is now presented to the input lead of the first stage and is amplified by the four amplifier stages to produce a comparator output voltage $V_{comp}$ which signifies either a logical 1 or a logical 0 on output terminal d. Thus, the signal on the output lead of comparator 12 is a voltage which signifies either a digital "1" or a digital "0".

The value of $V_{ref}$ is related to the protocol defining the acceptable threshold signal. $V_{ref}$ is higher for higher threshold values and lower for lower threshold values. In one embodiment $V_{ref}$ is programmable on the integrated circuit chip to permit different power levels to be used to define when a carrier is present. This programmability also permits the detection of different energy levels which can be used, for example, for automatic gain control. For example, in one embodiment n different energy levels are detected by employing n different voltage references, and the result is stored in a memory. These results can then directly control the gain of a digitally programmable gain stage, with greater gain being provided for lower level input signal levels.

In one embodiment hysteresis is provided in the comparator circuit of FIG. 4. One embodiment causes $V_{ref}$ to change slightly as a function of the output signal $V_{comp}$ on output terminal d. Typically, the value of the reference voltage will usually be given by $V_{ref}=X$dbm, where X is a selected value. The sense of the output signal is that if $V_{int}$ is greater than Xdbm, then a digital "1" is signified; if $V_{int}$ is less than Ydbm (where Y is a selected value less than X) a digital "0" is signified. To provide a comparator with hysteresis, the output remains a digital "1" for small fluctuations of the absolute value of input signal $V_{int}$. To guarantee this, as soon as the output signal $V_{comp}$ signifies a digital "1", the reference voltage $V_{ref}$ is decreased by a small amount. Thus, it will take more than a minor noise-related fluctuation of the input carrier $V_{in}$ (FIG. 1), which in turn provides a minor fluctuation of the integrated voltage $V_{int}$, to change the output from a "1" to a "0". The reverse approach can, if desired, also be used by increasing the value of $V_{ref}$ once a digital "0" is reached, e.g., once Ydbm is detected. This circuitry is not shown but will become readily apparent to one of ordinary skill in the art in light of the teachings of this specification.

The output signal $V_{comp}$ of comparator 12 is introduced to the digital counting chain 13 (FIG. 1). Counting chain 13 counts the time that a particular digital state, e.g. a digital "1", is present, providing that state signifies that a carrier signal of sufficient threshold amplitude is present on the input lead. In a preferred embodiment, once the threshold conditions are met (after completion of handshake routines, as is well known in the art) and determination is made of the threshold amplitudes, it is necessary to detect a mark for a specified period of time in order for a satisfactory carrier signal to be indicated to be present. The mark is detected in subcircuit 14, of well known design. This mark will represent a logical "1" (i.e., carrier is received having a frequency representing a logical one).

In one embodiment, digital counter chain 13 also contains a delay which requires a digital "1" to be absent for at least a predefined minimum period of time in order to provide an output signal on line 17 which signifies the absence of a carrier signal. Thus, if the digital "1" is absent for only a short period of time (less than the predefined period of time) the output signal on line 17 will continue to indicate the presence of a carrier in order to prevent undesired termination of the transmission of data due to a very short, and inconsequential, absence of a carrier.

The specific embodiments presented in the specification are intended to serve by way of example only and are not to be construed as limitations on the scope of my invention. Many other embodiments of my invention will become apparent to those of ordinary skill in the art in light of the teachings of this specification.

I claim:

1. A carrier detection circuit for determining the presence of a carrier signal on an input lead comprising:
   means for rectifying the signal on said input lead and providing a rectified signal;
   integration means for integrating said rectified signal and providing an integrated signal;
   a comparator for comparing said integrated signal with a reference signal, said comparator producing a comparator output signal whenever the amplitude of said integrated signal equals or exceeds the amplitude of said reference signal; and
   timing means for receiving of said comparator output signal and determining the length of time that a comparator output signal has been received and for providing an output signal indicating when a carrier signal has been detected for a time greater than a selected length of time.

2. A carrier detection circuit for determining the presence of a carrier signal, in accordance with claim 1 wherein said means for rectifying includes at least one gain stage for amplifying said rectified signal.

3. A carrier detection circuit in accordance with claim 2 wherein said at least one gain stage includes a switched capacitor gain stage.

4. A carrier detection circuit for determining the presence of a carrier signal in accordance with claim 3 wherein said switched capacitor gain stage has multiple capacitors which may be selectively switched to set the gain, said gain being either positive or negative as desired.

5. A carrier detection circuit for determining the presence of a carrier signal in accordance with claim 1 wherein said comparator includes hysteresis means for holding said comparator output signal in a particular digital state unless said integrated signal deviates by a set amount.

6. A carrier detection circuit in accordance with claim 5 wherein said hysteresis means comprises means to adjust the level of said reference signal once a particular digital output state has been attained.

7. A carrier detection circuit for determining the presence of a carrier signal in accordance with claim 1 wherein said timing means comprises a digital counter.

8. A carrier detection circuit in accordance with claim 1 in combination with a mark detect circuit for detecting the presence of a mark in said carrier signal, the output of said mark detect circuit being introduced to said timing means and said timing means providing an output signal indicating when a carrier signal has been detected for a time greater than a first selected length of time and a mark has been detected for a time greater than a second selected length of time.

9. A carrier signal detection circuit in accordance with claim 1 in which said means for rectifying said carrier signal on said input lead comprises:
   an input lead for receiving said carrier signal;
   amplifier means having an inverting input lead and an output lead;
   a first capacitor having a first plate connected to said output lead of said amplifier means and a second plate connected to said inverting input lead of said amplifier means;
   a second capacitor having a first plate connected to said inverting input lead of said amplifier means, and having a second plate;
   first switch means connected between said output lead of said amplifier means and said inverting input lead of said amplifier means;
   second switch means connected between said input lead and said second plate of said second capacitor;
   third switch means connected between said second plate of said second capacitor and a reference voltage lead; and
   means for controlling said first, second and third switch means wherein, when said input signal is more negative than said reference voltage, during a first time period said first and second switch means are closed and said third switch means is open, and during a second time period said first and second switch means are open and said third switch means is closed, thereby providing an output signal on said output lead which is equal to $-\alpha V_{in}$, where $\alpha$ is the gain of said amplifier means and $V_{in}$ is the voltage of said carrier signal, and wherein when said carrier signal is more positive than said reference voltage, during a first time period said second switch means is open and said first and third switch means are closed, and during a second time period said second switch means is closed and said first and third switch means are open, thereby providing an output signal on said output lead which is equal to $+\alpha V_{in}$.

10. The structure as in claim 9 which further comprises additional capacitors which can be selectively connected to select the gain of said amplifier means.

11. A carrier detection circuit in accordance with claim 1 in which said comparator for comparing said integrated signal with a reference signal comprises:
   an operational amplifier having an inverting input lead serving as the input lead of said comparator for receiving said integrated signal, a noninverting input lead, and an output lead serving as the output lead of said comparator; and
   means for applying a selected voltage to said noninverting input lead of said operational amplifier, said selected voltage having a first polarity when said integrated signal is positive and said selected voltage having a second polarity opposite said first polarity when said integrated signal is negative.

12. An automatic gain control circuit comprising:
means for providing a plurality of reference voltages;
means for determining the presence and level of a carrier signal by sequentially comparing said carrier signal with said plurality of reference voltages; and
means for amplifying said carrier signal, said means for amplifying providing a gain which is selected to provide an amplified carrier signal of a desired level.

* * * * *